Aug. 6, 1929.　　　J. E. BELL ET AL　　　1,723,675
FURNACE BURNING FUEL IN SUSPENSION
Filed Dec. 7, 1923　　4 Sheets-Sheet 1

WITNESS
Gustav Genzlinger

INVENTORS
John E. Bell
George P. Jackson
BY
Synnestvedt & Lechner
ATTORNEYS

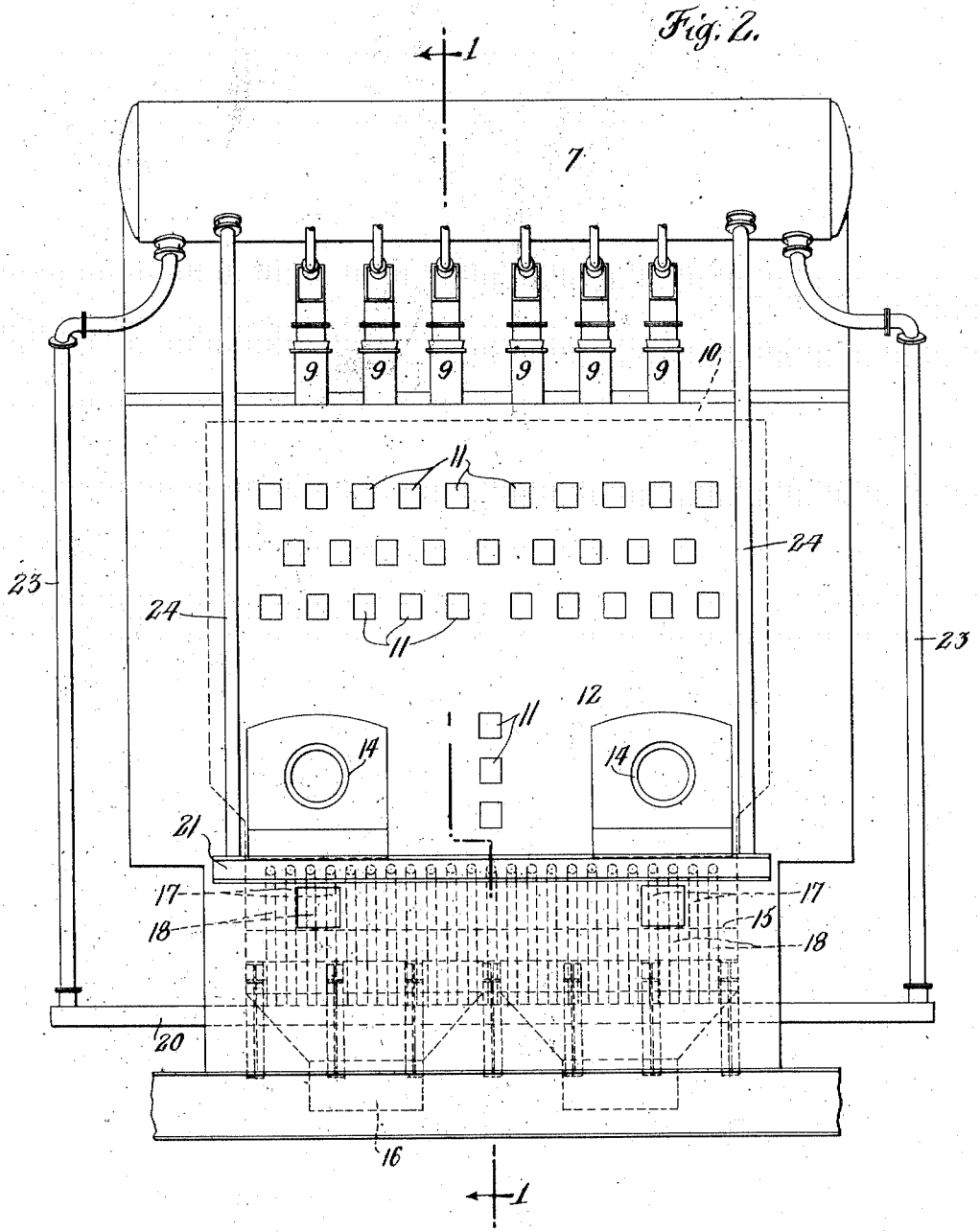

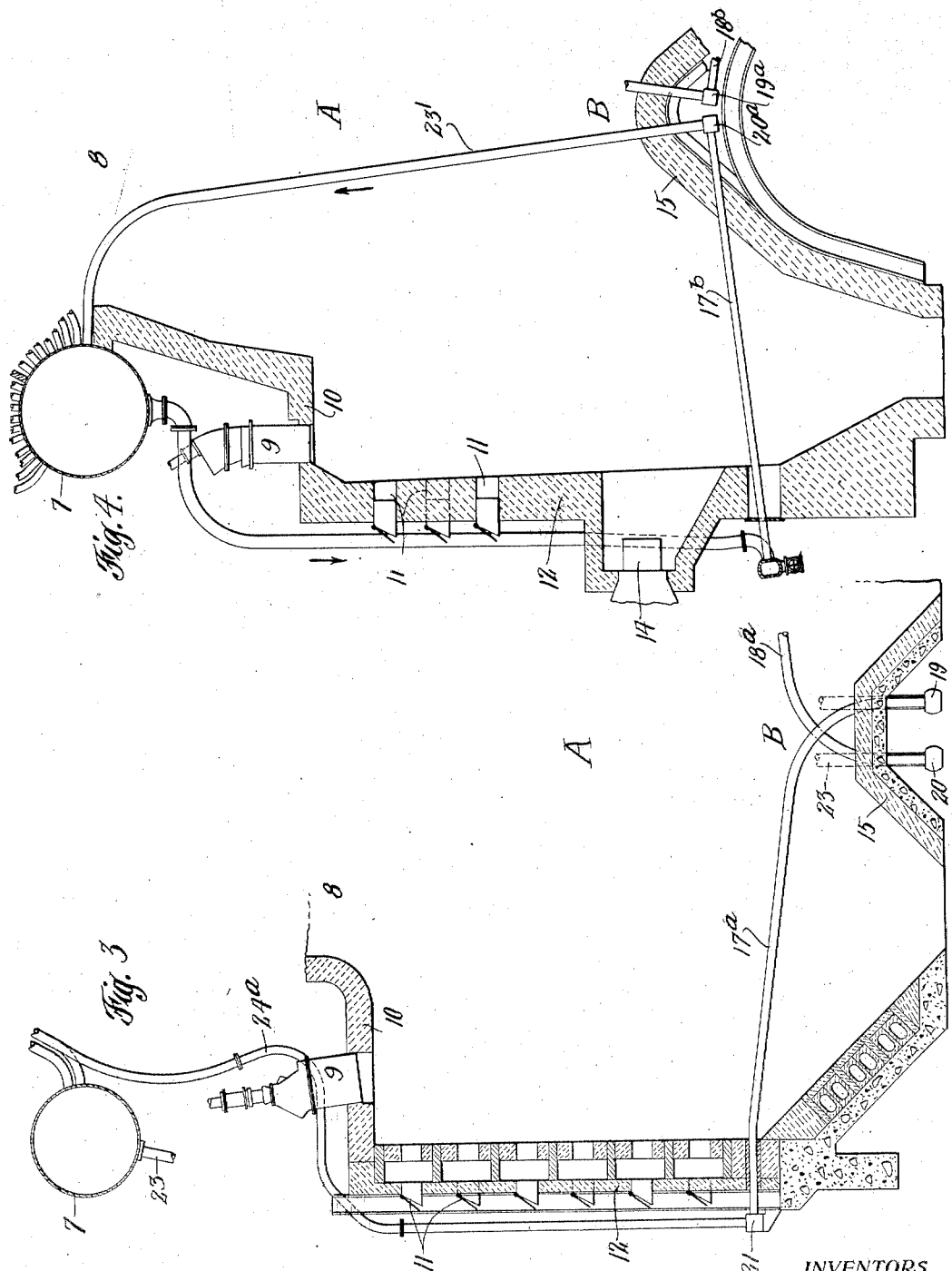

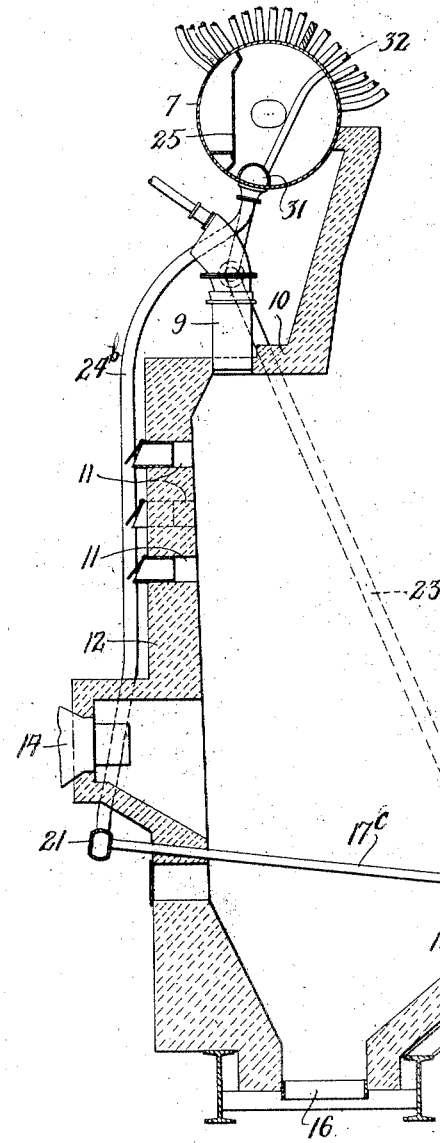
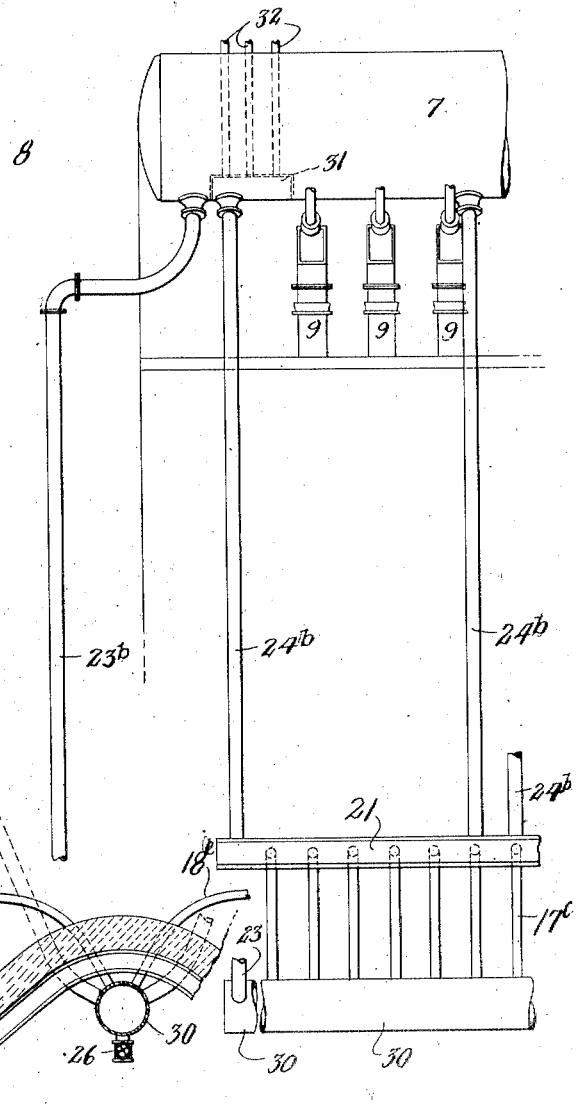

Patented Aug. 6, 1929.

1,723,675

UNITED STATES PATENT OFFICE.

JOHN E. BELL, OF BROOKLYN, AND GEORGE P. JACKSON, OF FLUSHING, NEW YORK, ASSIGNORS TO COMBUSTION ENGINEERING CORPORATION, A CORPORATION OF NEW YORK.

FURNACE BURNING FUEL IN SUSPENSION.

Application filed December 7, 1923. Serial No. 679,103.

This invention relates to improvements in furnaces burning fuels, and is especially useful in connection with the burning of pulverized fuel under stationary boilers for the generation of steam.

Heretofore in this art it has been customary in certain installations to employ a "water screen" in the lower regions of the combustion chamber and elsewhere for the purpose of creating a cooling zone intermediate the zone of combustion and a refractory surface defining the combustion chamber toward which refuse particles passing from the flame stream may travel and lodge, in order that such refuse particles may be cooled in transit below the point at which they will coalesce and run together in the form of slag. Such slag is quite detrimental to the refractories. The water screens heretofore employed in the bottom of the combustion chamber have usually consisted of a plurality of substantially horizontally disposed tubes the ends of which respectively extend out through the front and the rear or bridge walls of the combustion chamber, with the ends of the tubes connected to headers which in turn are connected into the circulation of the boiler, the water screen tubes being sufficiently inclined to permit of the necessary circulation. The absorption of heat creates the cooling zone desired.

This arrangement of water screen cannot be effectively employed in high capacity installations where the space to be spanned is quite large, as is the case, for example, when the combustion chamber is fired from more than one side. The reasons for this are primarily, first, that if single tubes spanning the space were employed, the screen at one end, would be so much higher than at the other end that the furnace chamber would be unduly increased in useless space in order to maintain proper operating conditions, with the result that the initial cost of installation would be high and the losses by radiation to the exterior too great; and second, that sagging and other difficulties would be incident to the employment of single tubes spanning the space.

One of the purposes of the present invention is to overcome the foregoing difficulties and to provide a simple and effective form of water screen which will accomplish the desired cooling.

Another object is to provide an arrangement by virtue of which the cooling effect is greatest where most needed.

The foregoing together with such other objects as may hereinafter appear, or are incident to our invention, we accomplish by means of a construction, the preferred embodiments of which we have illustrated in the accompanying drawings wherein Fig. 1 is a vertical cross-section through one form of boiler and furnace to which our invention is especially applicable, such section being taken on the line 1—1 of Fig. 2;

Fig. 2 is a front elevation of the furnace of Fig. 1;

Figs. 3 and 4 are fragmentary vertical sections illustrating modifications of our invention;

Fig. 5 is a vertical cross-section through a furnace illustrating still another modification of our invention;

Fig. 6 is a front elevation of the furnace of Fig. 5.

Figure 1:
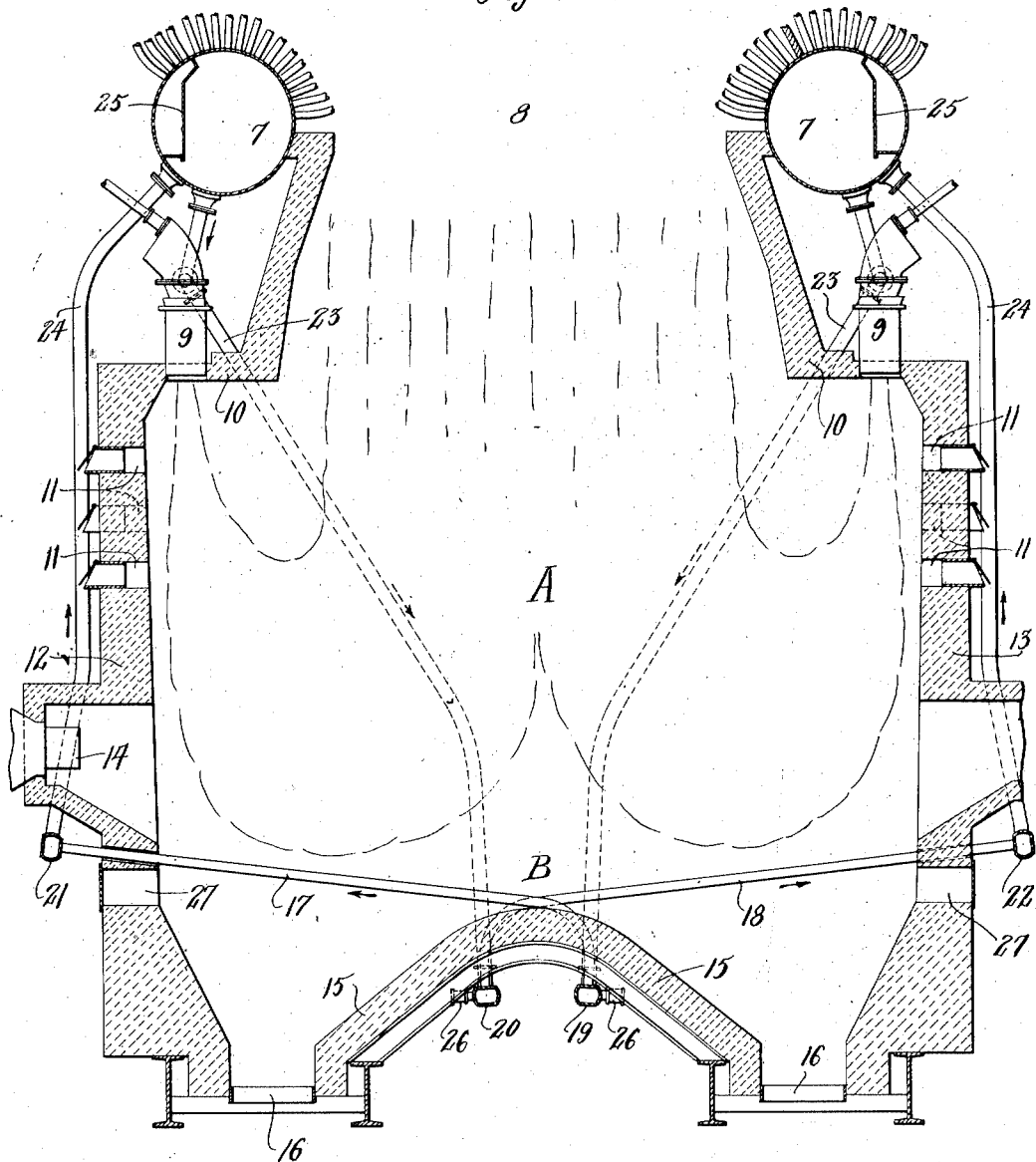

Referring now to Figs. 1 and 2, the reference numeral 7 indicates the lower drums of a tubular boiler of the Ladd type, in which the tubes incline upwardly and inwardly over the outlet 8 of a combustion chamber A, the waste gases traversing the passes in the tubes which may be baffled in any desired manner. On either side of the outlet 8 a plurality of pulverized coal burners 9 are arranged to discharge the coal— preferably with from 30 to 40% of the air required for combustion—downwardly into the combustion space through the arches 10. The incoming fuel is ignited by the heat of the combustion chamber and as it descends, it encounters the additional air required for combustion which is admitted at successive levels through the inlets 11 which are damper controlled. The fuel travels downwardly until its momentum is overcome by the draft, whereupon the fuel and flame streams revert on themselves in U-form, the ascending portions of the flame streams rising together toward the outlet 8. The size of the combustion chamber is such that combustion is completed before the tubes of the boiler are reached and the bend in the flame stream occurs well above the bottom of the combustion chamber.

By this arrangement the fuel particles are brought successively into contact and mixed with oxygen laden air, as combustion proceeds, and the descending portions of the fuel and flame stream are subjected to the heat of the ascending portions. The ascending portions meet and rise together in the central portion of the combustion chamber and roll on each other producing eddying which promotes proper admixture, in which connection it will be observed that portions of the air admitted through the upright walls 12 and 13, border the fuel and flame streams on the convex sides thereof and are drawn into the flame stream at the juncture of the rising portions thereof. Part of the air required for combustion may also be introduced through the openings 14, which also afford access to the lower regions of the combustion chamber.

The central portion 15 of the floor or bottom of the combustion chamber rises above the general plane of the floor, making the bottom portions of the combustion space somewhat in the shape of hoppers through which the deposited refuse matter may be discharged through the outlets 16, which are preferably gate controlled so that air is admitted only when discharging the refuse.

The lower regions of the combustion chamber are cooled by means of the water screen, indicated as a whole by the reference letter B. Such water screen is composed of two sets of oppositely inclined pipes 17 and 18. These pipes are generally horizontally disposed with an inclination such that circulation may take place therethrough, as will hereinafter be more fully pointed out, and they are spaced apart laterally a distance such that the refuse particles will freely gravitate therethrough to the bottom of the combustion chamber. The inner ends of the pipes 17 are bent downwardly and pass out through the raised portion 15, while the outer ends thereof extend through the wall 12, and the tubes 18 are similarly disposed with respect to the wall 13. The inner ends of the two sets of tubes connect respectively with the header 19 and the header 20, and the outer ends with the headers 21 and 22 respectively. Two or more downcomer pipes 23 of larger diameter than that of the tubes 17 and 18 connect the headers 19 and 20 with the drums 7; and two or more upcomer pipes 24 connect the headers 21 and 22 to their respective drums 7. The circulation is in the direction indicated by the arrows in Fig. 1. The tubes 23 are of sufficiently large size to adequately supply the respective sets of water screen tubes with sufficient water, while the pipes 24 are of sufficient size to readily carry off the steam which is generated in the water screen, in which connection the water screen constitutes a very effective portion of the evaporating surface of the boiler. The steam discharging from the tubes 24 is prevented, by the baffling 25 in the drums 7, from producing siphoning.

It will be noted that the headers 19 and 20 are anchored and that the tubes 17, 23 and 24 have bends, so that expansion and contraction are provided for. Blow-off cocks 26 are provided for the headers 19 and 20 for clean-out purposes.

It will be noted that the inner end portions of the sets of tubes 17 and 18 extend past one another so that the cooling effect at the central portion of the lower part of the combustion chamber is materially increased thereby providing, among other things, for the protection of the raised portion 15 of the floor.

The effect of the water screen, as before indicated, is to cool the precipitating ash in transit below the slagging point so that coalescence of such particles into a body of slag is prevented. The deposit, therefore, remains in the form of a sand like, flocculent material, readily susceptible of removal without shut-downs. Should any of the deposit accumulate on the top of the raised portion 15, access may be had thereto either through the openings 14 or through the openings 27. These latter are preferably closed by doors which may be opened to admit additional air for combustion should the particular operating conditions so demand.

By employing two sets of oppositely inclined water screen tubes the vertical distance between the lower end of the tubes and the higher end of the tubes in the combustion space is just half what it would be were a single length of the tube employed to span the combustion space. Thus the increase in furnace volume which would be otherwise required is avoided and the dead space reduced to a minimum which obviously involves a reduction in size of the furnace structure, considered as a whole, with the avoidance of excessive losses by radiation which would be incident to a larger furnace structure. At the same time, the sagging incident to the use of long tubes is avoided and tubes of commercial lengths may be employed.

In the construction of Fig. 3, the inner ends of the tubes $17^a$ and $18^a$ rise somewhat above the raised portion 15 before they begin their substantially horizontal flight which has the effect of increasing the cooling action in the central portion of the combustion chamber over that shown in Fig. 1. Also the pipes $24^a$ are connected to tubes of the boiler instead of discharging into the drums 7.

In the arrangement of Fig. 4 the direction of circulation is reversed, and the upcomer pipes 23', instead of being located exterior of the furnace pass upwardly through the combustion space, for which purpose they are spaced at wide intervals, say, for example, on three and one half inches centres as compared with the fourteen inches centres of the tubes 17$^b$ and 18$^b$. The headers 19$^a$ and 20$^a$, as before, are anchored but it is unnecessary to provide any bends in the tubes 17$^b$ and 18$^b$, expansion and contraction being taken care of without the necessity thereof.

In the construction of Figs. 5 and 6 a single central header 30 is provided for the tubes 17$^c$ and 18$^c$ and the tubes 23$^b$. The tubes 24$^b$ differ in that they discharge into small headers 31 located within the drums 7 from which headers the steam flows out through the extended boiler tubes 32 which connect with such headers as indicated in such figures.

We claim:

1. In combination a combustion chamber for burning fuel in suspension, means for introducing the fuel in opposite ends thereof, and a water screen in the lower part of the combustion chamber for creating a relatively cool zone therein comprising two sets of tubes of less length than the horizontal length of the chamber and having their inner end portions extending past each other.

2. In combination a combustion chamber for burning fuel in suspension and having the central portion of its floor raised above the general plane of the floor to provide a double hopper-like bottom, means for introducing the fuel, and a water screen comprising two sets of tubes spaced above the floor and each extending part way across the chamber from opposite sides thereof, the tubes of each set having their outer ends extending through an upright wall of the chamber and their inner ends through said central raised portion of the floor.

3. In combination, a combustion chamber having an outlet in an upper part, means for introducing fuel to be burned in space in such chamber, and two rows of relatively closely spaced evaporating tubes in the lower part of the chamber beneath the zone of combustion and extending from opposite sides, the tubes of one row being staggered with respect to the tubes of the other row, and the two rows extending transversely of the chamber with the inner end portions of the rows in close proximity to one another.

4. In combination, a combustion chamber for burning fuel in space, means for introducing the fuel, a boiler, two rows of tubes at the bottom of the chamber extending inwardly and downwardly to about the middle portion of the chamber, one row extending inwardly from one side of the chamber and the other row extending inwardly from the opposite side of the chamber, and the inner ends of the tubes passing to the exterior, downcomer means connecting said end of the tubes in the circulation of the boiler and upcomer means connecting the other end of the tubes in the circulation of the boiler.

5. In combination, a combustion chamber for burning fuel in space, means for introducing the fuel, two rows of tubes at the bottom of the chamber extending inwardly and downwardly to about the middle portion of the chamber, one row extending inwardly from one side of the chamber and the other row extending inwardly from the opposite side of the chamber, and the inner ends of the tubes passing to the exterior, and boiler parts with which the tubes are connected at their ends so a circulation takes place therethrough.

In testimony whereof, we have hereunto signed our names.

JOHN E. BELL.
GEORGE P. JACKSON.